3,316,182
CATALYSTS FOR SYNTHESIS OF ACRYLONITRILE FROM OLEFINS, AMMONIA AND OXYGEN
Edgar L. McDaniel and Howard S. Young, Kingsport, Tenn., assignors to Eastman Kodak Company, Rochester, N.Y., a corporation of Delaware
No Drawing. Filed Jan. 19, 1966, Ser. No. 521,499
5 Claims. (Cl. 252—451)

This application is a continuation-in-part of our copending application Ser. No. 83,916, filed Jan. 23, 1961, now U.S. Patent 3,262,962.

This invention relates to the preparation of aliphatic unsaturated nitriles, and more particularly acrylonitrile, by a novel and improved method wherein an olefin, ammonia and oxygen are reacted together in the vapor phase, in the presence of a particular catalyst comprising bismuth and certain inorganic heteropoly acids.

It is known that unsaturated nitriles can be prepared by reacting olefins with ammonia under oxidizing conditions at elevated temperatures. For example, J. N. Cosby in U.S. Patent No. 2,481,826, issued Sept. 13, 1949, describes the preparation of lower aliphatic nitriles such as acrylonitrile, methacrylonitrile and acetonitrile by reacting an olefin such as propene, butene -1, etc., with ammonia and oxygen, at 400–600° C., in the presence of various oxidation catalysts and especitlly vanadium oxides containing molybdenum oxide. Where propene was used as the starting olefin, yields not exceeding about 6 mole percent (Example 6) of acrylonitrile and a substantial amount (10 mole percent) of hydrogen cyanide were obtained. In J. D. Idol, Jr., U.S. Patent No. 2,904,580, issued Sept. 15, 1959, a vapor phase method is also described for preparing acrylonitrile, wherein a mixture of propylene, amomnia and oxygen is passed over a catalyst comprising the bismuth, tin, and antimony salts of phosphomolybdic and molybdic acids and bismuth phosphotungstate. This process is stated to require not only careful control of the surface area of the catalyst and pressure conditions, but the amount of water employed in a critical factor.

We have now found that by reacting propylene, ammonia and oxygen at elevated temperatures, in the presence of a catalyst comprising bismuth and an inorganic heteropoly acid or salts thereof, and more especially a catalyst comprising in effect a mixture of essentially of bismuth oxide and dodecamolybdoceric acid, that the reaction goes smoothly to a relatively higher conversion to the principal product acrylonitrile, and to a considerably lesser amount of acetonitrile, with a minimum of by-products as compared with prior art processes such as mentioned above, and that water is not critical to operability of the process of this invention, since excellent activity and selectivity can be obtained without water diluent.

It is, accordingly, an object of the invention to provide a novel and improved method for the synthesis of aliphatic unsaturated nitriles wherein a carbon-to-carbon double bond is conjugated with the carbon-to-nitrogen triple bond, and in particular acrylonitrile.

Another object is to provide a novel process for converting propylene to acrylonitrile in high conversion and high yield in a continuous process. Yet another object is to convert olefins to nitriles while maintaining the olefinic bond in the alkyl moiety of the nitrile.

An object of the invention is to provide a means of converting propylene to acrylonitrile by use of a bismuth and dodecamolybdoceric acid catalyst. A further object of the invention is to provide a means of converting olefins to alpha,beta-unsaturated nitriles by use of a bismuth and dodecamolybdoceric acid catalyst. Another object is to introduce nitrogen from ammonia into organic compounds by use of a bismuth and dodecamolybdoceric acid catalyst.

It is also an object of the invention to provide a method for synthesizing acrylonitrile without the use of such hazardous and toxic chemicals as hydrogen cyanide, acetylene, and ethylene oxide.

Another object of the invention is to provide a process of converting propylene, ammonia and oxygen into acrylonitrile over a bismuth and dodecamolybdoceric acid catalyst wherein the conditions of the process may be varied over wide ranges. It is a further object of the invention to provide a means of producing acrylonitrile with the simultaneous production of large quantities of heat which may be recovered and utilized.

A further object of the invention is to provide a novel catalyst comprising bismuth and dodecamolybdoceric acid for the conversion of propylene, ammonia, and oxygen to acrylonitrile, said catalyst preferably containing from about 1 to 25 parts by weight of bismuth oxide and from 1 to 25 parts by weight of dodecamolybdoceric acid. Another object of the invention is to provide a bismuth and dodecamolybdoceric acid catalyst for the conversion of methyl groups attached to olefinic carbon atoms into nitrile groups.

Other objects will become apparent from the description and examples hereinafter.

In accordance with the invention, we prepare unsaturated aliphatic nitriles, and more especially acrylonitrile, by passing a feed mixture comprising a short-chain olefin containing from 3–5 carbon atoms such as propylene, butylene, 2-methylbutene -1, etc., ammonia and oxygen, in vapor phase at elevated temperatures, over a catalyst comprising bismuth and an inorganic heteropoly acid. The preferred process is the conversion of propylene to acrylonitrile employing bismuth oxide for a bismuth compound convertible with heat to the oxide with dodecamolybdoceric acid. The reaction is illustrated below with propylene.

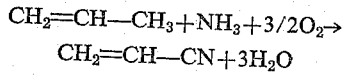

$$CH_2=CH-CH_3+NH_3+3/2O_2 \rightarrow$$
$$CH_2=CH-CN+3H_2O$$

A minor proportion of acetonitrile is also formed. The ratios of reactants may be widely varied from the theoretical mole ratios of proylene:oxygen:ammonia of 1:1½:1. We prefer ratios near these values; however, the process is operable at propylene:oxygen ratios from as low as 1:0.05 to those as high as 1:10 and proylene:ammonia ratios as low as 1:0.05 to those as high as 1:10, i.e., from 0.05–10.0 moles of ammonia and from 0.05–10.0 moles of oxygen per mole of the olefin. Both propylene:oxygen and propylene:ammonia ratios may be varied from the theoretical ratios. Water may be fed to the reactor, or it may be omitted. Water acts as a diluent and, when used, the preferred amounts range from 0.05–2.0 moles per mole of the propylene in the feed. Nitrogen may be fed to the reactor. This has no particular effect upon the chemistry involved, but has the practical advantage that since nitrogen is not detrimental, air may be used as the source of oxygen. If air is used, the ratio of oxygen to nitrogen will be approximately 1:4. The temperature of the reaction can also be varied within the limits of about 300–600° C., but preferably in the range of about 400–550° C. The reaction is also not significantly pressure dependant. For example, it may be operated satisfactorily at atmospheric pressures, which condition is preferred, but lower or sub-atmospheric pressures and higher or super-atmospheric pressures may also be used to give generally similarly good results. The choice of operating pressures may be governed by economic considerations. The gaseous hourly space velocity (GHSV) may also be varied over a wide range, for example, values (S.T.P.)

low as 100 may be used, and values as high as 6000 may be used. The preferred space velocity is in the range of about 150–1000. The catalyst may be used either in a fixed bed or in fluidized state. In the latter case, the catalyst exists as small particles which are suspended in an upflowing stream of reactant gases. The latter method of carrying out the invention offers advantages such as, for example, superior temperature control, and less explosive hazard. Water may be included, if desired, although this is not critical for the reaction goes well without such addition. Oxygen may be fed in elemental form or as air. Also, inert gases such as nitrogen, argon, etc., can be admixed with the oxygen.

In general, any type of apparatus that is suitable for carrying out the process of the invention in the vapor phase may be employed, e.g., a tubular type of reactor or furnace which can be operated in continuous or intermittent manner and is equipped to contain the catalyst in intimate contact with the entering gases. The reacted gases are then conducted to suitable cooling and separatory equipment and the products further separated and recovered by any of the methods known to those skilled in the art. For example, one such method involves scrubbing the effluent gases from the recator with cooled water or an appropriate solvent to remove the products of the reaction. In such case, the ultimate nitrile products may be separated by conventional means such as distillation of the resulting liquid mixtures. Unreacted ammonia and olefin may be recovered and recirculated through the system. Spent catalyst may also be reactivated by heating in contact with air.

The composition of the catalyst is all-important. Bismuth salts such as bismuth nitrate, bismuth hydroxide, bismuth chloride, etc., which decompose under the conditions of the catalyst preparation presumably to bismuth oxide ($Bi_2O_3$) are used as a promoter. With this is mixed a heteropoly acid, e.g., the preferred dodecamolybdoceric acid of the probable formula $H_8[Ce(Mo_2O_7)_6]$, and the mixture then calcined at 450–600° C. for several or more hours. Actually, the ammonium salt of this acid is used because it is more easily prepared than the free acid and is believed to decompose to the free acid under the high temperatures achieved in the calcination step. The mixture which is calcined can typically contain from about 1 to 42 parts by weight of bismuth nitrate and from 1 to 27 parts by weight of ammonium dodecamolybdocerate. A key portion of the invention resides in the incorporation of th heteropoly acid into the catalyst composition in the form of its ammonium salt. The concentrations of the bismuth component and the heteropoly acid component may each vary from about 3 percent to 75 percent by weight of the catalyst.

Other heteropoly acids and ammonium salts thereof which may be used in preparing the catalyst of the invention are represented by the following general formula:

$$H_8[X(Mo_2O_7)_6]$$

wherein X represents besides the mentioned cerium atom other rare earth atoms of the cerium group such as lanthanum, prasedymium, neohymium, samarium, etc., and other rare earths of the yttria group such as gadolinium, etc., or mixtures thereof. Compounds of this kind are described by C. G. Grosscup, J. Amer. Chem. Soc., 52, pages 5154–60 (1930). While molybdenum is shown as the coordinating element, it will be understood that other elements including the vanadium and chromium families of elements can be substituted for the molybdenum to form generally similar heteropoly acids, for example, vanadium, niobium, tantalum, chromium, tungsten and uranium. In addition, more than one of these elements may serve as coordinating elements in the heteropoly acid, and when more than one element serves as coordinating atoms, molybdenum may be included. The above acids may likewise be mixed with bismuth salts or oxide in the mentioned proportions, calcined as indicated and reduced to operable granules or particles.

In all of the following examples, exactly the same conventional equipment was employed for carrying out the reaction of the invention, as well as other reactions for comparative purposes. The products were analyzed by conventionel analytical procedures. The definitions as used in the examples and Table I are defined as follows:

The percent conversion to acrylonitrile may be based on propylene or on ammonia.

Based on propylene, percent conversion=

$$\frac{\text{moles acrylonitrile formed}}{\text{moles proplene fed}} \times 100 \text{ for any cut}$$

Based on ammonia, percent conversion=

$$\frac{\text{moles acrylonitrile formed}}{\text{moles ammonia fed}} \times 100$$

The yield may be calculated based on propylene or on ammonia.

Based on propylene, percent yield=

$$\frac{\text{moles acrylonitrile formed}}{\text{total moles proplene consumed}} \times 100$$

Based on ammonia, percent yield=

$$\frac{\text{moles acrylonitrile formed}}{\text{total moles ammonia consumed}} \times 100$$

Conversions and yields to acetonitrile are similarly defined with the moles of acetonitrile formed replacing moles of acrylonitrile in the appropriate expression.

Gaseous hourly space velocity (GHSV) as defined as the number of volumes of feed gases (S.T.P.) which pass through one volume of catalyst bed in one hour.

*Example 1*

A catalyst comprising 37 percent bismuth oxide and 33 percent dodecamolybdoceric acid on silica was prepared thusly: 400 g. of an aqueous silica sol which was 30 percent  was placed in a beaker equipped with a power stirrer and situated on an electric hot plate. Then 151 g. of ammonium dodecamolybdocerate crystals was pulverized with a porcelain mortar and pestle. The powdered ammonium dodecamolybdocerate was slowly added to the vigorously stirred silica sol, which resulted in a canary yellow slurry. The stirred slurry was heated to the boiling point, and a solution of 308 g. of bismuth nitrate in 220 ml. of dilute aqueous nitric acid was added slowly to the hot mixture. After additional heating and stirring, the mixture thickened. It was transferred to an evaporating dish and dried in an oven at 130° C. The preparation was then calcined four hours at 500° C. in a muffle furnace. The resulting catalyst was crushed, and a 40×100 mesh range of particles was taken. Two hundred milliliters of this was charged to a laboratory-scale fluidized solids reactor. The data shown in Table I were then taken for a series of runs. The catalyst was quite active and selective for the synthesis. Minor concentrations of acetonitrile and hydrogen cyanide were also formed.

Referring to the table, it will be noted that a yield as high as 70 mole percent of acrylonitrile, base on the propylene consumed was obtained at a temperature of 485° C., and a space velocity of 720, employing a feed mixture in the mole ratios of 1 mole of propylene to each 1.5 moles of oxygen, each mole of ammonia, each mole of water and each 6 moles of nitrogen. The conversion to acrylonitrile was 47.9 mole percent, while the conversion to acetonitrile was only 7.3 mole percent. Lower reaction temperatures resulted in lower conversions, for example, 28.7 mole percent of acrylonitrile at 460° C., while the conversion to acetonitrile increased slightly to 8.5 mole percent. However, all of the runs represent satisfactory operating conditions. As indicated previously, the water can be dispensed with entirely, if desired, without materially affecting the conversion and yield values for acrylonitrile.

Example 2

This example illustrates the adverse results obtained when only silica is used as the catalyst in the vapor phase reaction of propylene, ammonia and oxygen.

A sample of silica sol (30 percent $SiO_2$ in $H_2O$) was evaporated in an evaporating dish on a steam bath and then was dried in an oven at 130° C. After calcination at 500° C. for four hours, 200 ml. of 40×100 mesh silica was charged to a laboratory fluidized solids reactor. This material was tested at 450° C., with a propylene:oxygen:ammonio:water:nitrogen mole ratio of 1:1½:1:1:6, and a GHSV of 630. This material was almost inert, producing no nitrile and allowing only a small amount of propylene to be burned to $CO_2$ and $H_2O$.

When the reaction temperature was increased to 470° C. at the same GHSV and ratios of reactants as before, no nitriles were produced. Changing the propylene:oxygen:ammonia:water:nitrogen ratios to 1:2:1½:1:8 at 470° C. did not produce nitrile.

Example 3

This example illustrates the very poor results obtained when just a bismuth oxide on silica catalyst is employed in the vapor phase reaction of propylene, ammonia and oxygen.

A catalyst comprising 30 percent $Bi_2O_3$ on silica was prepared by adding bismuth nitrate in dilute nitric acid solution to silica sol. The white slurry was heated with stirring on a steam bath until it thickened. It was then dried in an oven at 130° C., and calcined for six hours in an air muffle furnace at 500° C. to decompose the nitrate. Two hundred grams of 40×100 mesh catalyst was tested in a laboratory fluidized solids reactor.

The data are shown in Table I. Some nitrile was produced, but the conversion and yields were low and more acetonitrile than acrylonitrile was produced.

Example 4

This example illustrates the fact that no acrylonitrile is produced at all when the catalyst employed for the reaction of propylene, ammonia and oxygen is a catalyst devoid of bismuth oxide, i.e. comprising dodecamolybdoceric acid on silica.

A catalyst comprising 33 percent dodecamolybdoceric acid on silica was prepared from ammonium dodecamolybdocerate and silica sol in the same manner as that described in Example 1. Two hundred ml. of 40×00 mesh catalyst was tested in a laboratory fluidized solids reactor (see Table I). This catalyst was quite inactive for acrylonitrile synthesis. Small quantities of acetonitrile were produced.

Example 5

A catalyst comprising 35.9 percent cerous molybdate ($Ce_2(MoO_4)_3$) and 35.4 percent bismuth oxide on silica was prepared as follows: 04.51 g. of ammonium heptamolybdate was dissolved in 1500 ml. of distilled water and the solution was filtered. Then a filtered solution of 147 g. of $CeCl_3$ in 400 ml. of distilled water was slowly added to the stirred molybdate solution. The resultant finely divided yellow precipitate was collected on a Buchner funnel. The precipitate was slurried with 500 ml. of distilled water and again collected on a Buchner funnel. It was then slurried with 200 ml. of distilled water and this slurry was slowly added to 400 g. of silica sol (30 percent $SiO_2$) with stirring. The yellow slurry was heated to the boiling point with stirring, and then a solution of 308 g. bismuth nitrate in dilute nitric acid was added. The preparation was heated with stirring until it thickened. It was transferred to an evaporating dish and water was removed on a steam bath. The preparation was dried in an oven at 130° C. and then was calcined four hours at 500° C. in a muffle furnace.

Two hundred milliliters of 40×100 mesh catalyst was charged to a laboratory fluidized solids reactor. The test results are shown in Table I. This catalyst had about half the activity for acrylonitrile synthesis as the bismuth dodecamolybdoceric acid catalyst in Example 1 above.

TABLE I

| Ex. | Catalyst | Catalyst Temp., °C. | Mole Ratio, Propylene: Oxygen:Ammonia: Water:Nitrogen [1] | GHSV, S.T.P. | Cut Time, min. | Mole Percent Conversion to Acrylonitrile, Based on Propylene or on Ammonia |
|---|---|---|---|---|---|---|
| 1 | 37% $Bi_2O_3$+33% dodecamolybdoceric acid on silica. | 490 | 1:1½:1:1:6 | 630 | 30 | 40.7 |
|  |  | 485 | 1:1½:1:1:6 | 720 | 30 | 47.9 |
|  |  | 490 | 1:1½:1:1:6 | 450 | 30 | 49.7 |
|  |  | 460 | 1:1½:1:1:6 | 630 | 30 | 34.5 |
|  |  | 460 | 1:1½:1:1:6 | 720 | 30 | 28.7 |
|  |  | 460 | 1:2:1:1:8 | 630 | 30 | 39.1 |
|  |  | 470 | 1:1½:1:1:6 | 540 | 30 | 47.2 |
|  |  | 490 | [2] 1:1½:1:0:6 | 650 | 30 | 38.0 |
| 3 | 30% $Bi_2O_3$ on silica. | 470 | 1:1½:1:1:6 | 630 | 28 | 1.8 |
| 4 | 33% dodecamolybdoceric acid on silica. | 475 | 1:1½:1:1:6 | 630 | 30 | 0 |
| 5 | 35.4% $Bi_2O_3$+35.9% cerous molybdate on silica. | 490 | 1:1½:1:1:6 | 630 | 30 | 23.7 |
|  |  | 500 | 1:1½:1:1:6 | 720 | 30 | 19.6 |
|  |  | 500 | 1:1½:1:1:6 | 450 | 30 | 21.3 |
|  |  | 490 | 1:1½:1:1:6 | 630 | 30 | 20.2 |

| Example | Mole Percent Yield of Acrylonitrile— | | Mole Percent Conversion to Acetonitrile, Based on Propylene or Ammonia | Mole Percent Yield of Acetonitrile— | |
|---|---|---|---|---|---|
|  | Based on Propylene | Based on Ammonia |  | Based on Propylene | Based on Ammonia |
| 1 | 51.0 | 49.8 | 9.1 | 11.4 | 11.1 |
|  | 70.0 | 47.9 | 7.3 | 10.5 | 7.3 |
|  | 57.8 | 49.7 | 6.0 | 6.9 | 6.0 |
|  | 51.4 | 34.5 | 7.6 | 11.3 | 7.6 |
|  | 46.5 | 28.7 | 8.5 | 13.8 | 8.5 |
|  | 58.2 | 39.1 | 7.2 | 10.7 | 7.2 |
|  | 64.1 | 47.2 | 8.1 | 10.9 | 8.1 |
|  | 53.9 | 44.9 | 6.0 | 8.5 | 7.1 |
| 3 | 4.1 | 1.8 | 7.1 | 16.0 | 7.1 |
| 4 | 0 | 0 | 7.9 | 14.7 | 9.7 |
| 5 | 29.7 | 40.5 | 10.2 | 12.8 | 17.4 |
|  | 26.7 | 35.7 | 9.8 | 13.4 | 17.9 |
|  | 25.1 | 31.7 | 14.7 | 17.4 | 22.0 |
|  | 28.6 | 36.7 | 10.6 | 15.1 | 19.3 |

[1] The oxygen and nitrogen were fed in the form of atmospheric air.
[2] Water diluent was not fed for this cut.

The results as tabulated in above Table I illustrate the unusual and synergistic effects of bismuth oxide and dodecamolybdoceric acid when combined in the catalyst. No satisfactory explanation can be given. Either component is quite inactive in the absence of the other. Undoubtedly part of the explanation lies in the porous and skeletal-like structure of the dodecamolybdoceric acid. However, even when this structure is present, an activator, i.e., bismuth, is necessary for activity to produce acrylonitrile.

Example 6

A catalyst comprising bismuth oxide and dodecamolyboceric acid on silica at the same concentrations as in Example 1 was prepared. The catalyst preparation procedure of Example 1 was followed except that an equivalent amount of freshly precipitated bismuth hydroxide, slurried in water, was used instead of bismuth nitrate solution. The resulting catalyst was tested at 450° C. with a feed stream comprising 1 mole of ammonia, 1 mole of steam, and 7½ moles of air per mole of propylene, at a GHSV (S.T.P.) of 840. The conversion to acrylonitrile based on propylene or on ammonia was 55.5%; the yield based on propylene consumed was 72.2%. The conversion to acetonitrile based on propylene or on ammonia was 9.4%; the yield based on propylene consumed was 12.2%.

Example 7

A catalyst was prepared according to the procedure of Example 1, except that an equivalent amount of bismuth chloride was used instead of bismuth nitrate. The catalyst was tested at the same conditions as in Example 6. The conversion to acrylonitrile based on propylene or on ammonia was 28.6%. The yield of acrylonitrile based on propylene consumed was 50.8%. The conversion to acetonitrile based on propylene or on ammonia was 4.1%; the yield based on propylene consumed was 7.2%.

Example 8

A catalyst was prepared which was equivalent in bismuth, cerium, and molybdenum content to the catalyst of Example 1. This catalyst was prepared from ceric ammonium nitrate and ammonium heptamolybdate so that ammonium dodecamolybdocerate was formed in situ during the catalyst preparation. To 400 g. of stirred aqueous silica sol which was 30% $SiO_2$ was added 142 g. of ammonium heptamolybdate. The slurry was stirred and warmed gently, yielding a clear sol which set to a gel. Then 36.7 g. of ceric ammonium nitrate dissolved in 150 ml. of water was added with stirring; this resulted in a thin, pale yellow slurry. The slurry was warmed and stirred, and to this silica-ammonium dodecamolybdocerate slurry was added a solution of 308 g. of bismuth nitrate dissolved in 230 ml. of dilute nitric acid. The preparation was dried, calcined 4 hr. at 500° C. in a muffle furnace, crushed and sieved. The catalyst was tested at 510° C., with a GHSV of 840, with a feed stream comprising 1 mole of ammonia, 1 mole of steam, and 7½ moles of air per mole of propylene. The conversion to acrylonitrile based on propylene or on ammonia was 50.5%; the yield based on propylene consumed was 63.2%. The conversion to acetonitrile was 5.9%; the yield of acetonitrile based on propylene consumed was 7.3%.

Example 9

A catalyst was prepared comprising 8% bismuth oxide and 10% dodecamolybdoceric acid on silica, in a manner similar to that of Example 1, but with appropriate modifications in the quantities of reagents employed. The catalyst was tested in a fluid-bed reactor for oxidizing propylene to acrolein at 404° C. and 2.3 sec. contact time. The feed stream comprised 6 moles of air and 3 moles of steam per mole of propylene. The conversion to acrolein was 10.1%, at 37.6% yield based on propylene consumed.

Example 10

Another catalyst comprising 15% bismuth oxide and 60% dodecamolybdoceric acid on silica was prepared as in Example 1, with appropriate modifications in the quantities of reagents employed. This catalyst was tested for oxidizing propylene to acrolein at the same temperature and contact time as in Example 9. The feed stream comprised propylene and air in a mole ratio of 1:6. The conversion to acrolein was 24.9% at 52.1% yield.

While the process of the invention has been shown in the examples with specific proportions of bismuth oxide and dodecamolybdoceric acid, it will be understood that any proportions coming within the mentioned operable range will give generally similar good conversions and yields of acrylonitrile under the prescribed conditions. Also, as previously set forth the other mentioned heteropoly acids can be substituted in the process of the invention for the dodecamolybdoceric acid. Acrylonitrile is of course known to be useful as an intermediate in organic synthesis of pharmaceuticals, dyes, etc., as well as being the basic component in many synthetic polymers that are useful for preparing fibers, sheets, molded objects, and the like.

The invention has been described in detail with particular reference to preferred embodiments thereof, but it will be understood that variations and modifications can be effected within the spirit and scope of the invention as described hereinabove and as defined in the appended claims.

We claim:
1. A catalyst composition consisting essentially of a calcined mixture of from about 1 to 25 parts by weight of bismuth oxide and from 1 to 25 parts by weight of dodecamolybdoceric acid.
2. The composition of claim 1 wherein silica is employed as a carrier for the said calcined mixture.
3. A process for preparing a catalyst composition which comprises heating a mixture consisting essentially of from about 1 to 42 parts by weight of bismuth nitrate and from 1 to 27 parts by weight of ammonium dodecamolybdocerate, at a temperature of from 450–600° C., until calcination is complete.
4. The process according to claim 3 wherein the said mixture is added to a silica sol to form a slurry, and the said slurry then dried and calcined at 450–600° C.
5. The process according to claim 3 in which said ammonium dodecamolybdocerate is added to a silica sol to form a slurry, said bismuh nitrate is added to said slurry, the resulting mixture is heated to form a gel and said gel is calcined at 450° C. to 600° C.

References Cited by the Examiner
UNITED STATES PATENTS 2,481,826   9/1949   Cosby _____ 260—465.3
3,009,943   11/1961  Hadley et al. _____ 260—465.3

DANIEL E. WYMAN, *Primary Examiner.*

OSCAR R. VERTIZ, *Examiner.*

E. J. MEROS, C. F. DEES, *Assistant Examiners.*

UNITED STATES PATENT OFFICE
CERTIFICATE OF CORRECTION

Patent No. 3,316,182                                         April 25, 1967

Edgar L. McDaniel et al.

It is hereby certified that error appears in the above numbered patent requiring correction and that the said Letters Patent should read as corrected below.

Column 1, line 27, for "expecitlly" read -- especially --; line 39, for "in" read -- is --; column 2, line 34, for "for" read -- or --; column 3, line 47, for "th" read -- the --; line 59, for "neohymium" read -- neodymium --; column 4, line 5, for "conventionel" read -- conventional --; lines 12 and 22, for "proplene", each occurrence, read -- propylene --; column 6, line 2, for "oxygent" read -- oxygen --; line 8, for "40×00" read -- 40×100 --; line 15, for "(Ce2(MoO4)3" read -- $(Ce_2(MoO_4)_3$ --; line 16, for "04.51" read -- 104.5 --.

Signed and sealed this 17th day of September 1968.

(SEAL)
Attest:

Edward M. Fletcher, Jr.                                 EDWARD J. BRENNER
Attesting Officer                                            Commissioner of Patents